(12) United States Patent
Anand et al.

(10) Patent No.: US 7,338,271 B2
(45) Date of Patent: Mar. 4, 2008

(54) EXTRUSION HEAD HAVING A ROTATING DIE

(75) Inventors: Prem Anand, Waterloo (CA); John C. Giardina, New Port Richey, FL (US); Joseph J. Bartoszewic, Palm Harbor, FL (US)

(73) Assignee: Cangen Holdings, Inc., Chamblee, GA (US)

( * ) Notice: Subject to any disclaimer, the term of this patent is extended or adjusted under 35 U.S.C. 154(b) by 359 days.

(21) Appl. No.: 10/848,647

(22) Filed: May 19, 2004

(65) Prior Publication Data

US 2005/0260407 A1 Nov. 24, 2005

(51) Int. Cl.
*B29C 47/04* (2006.01)
*B29C 47/24* (2006.01)

(52) U.S. Cl. ............. 425/131.1; 425/381; 425/382.3; 425/462

(58) Field of Classification Search ............. 425/131.1, 425/133.1, 381, 380, 382.3, 462
See application file for complete search history.

(56) References Cited

U.S. PATENT DOCUMENTS

| | | | | |
|---|---|---|---|---|
| 3,067,084 A | * | 12/1962 | Nalle, Jr. ............... | 156/167 |
| 3,376,605 A | * | 4/1968 | Beattie ................. | 425/205 |
| 3,620,883 A | * | 11/1971 | Nalle et al. ............ | 156/500 |
| 3,752,614 A | * | 8/1973 | Bremer ................. | 425/113 |
| 3,884,753 A | * | 5/1975 | Nalle, Jr. .............. | 428/36.1 |
| 4,690,627 A | * | 9/1987 | Sebille ................. | 425/113 |
| 6,669,458 B2 | * | 12/2003 | Guillemette et al. ....... | 425/107 |
| 7,128,862 B2 | * | 10/2006 | Wang ................... | 264/171.29 |
| 2002/0106417 A1 | * | 8/2002 | Guillemette et al. ....... | 425/107 |
| 2003/0100869 A1 | * | 5/2003 | Wang .................. | 604/264 |

* cited by examiner

*Primary Examiner*—Jill Gray
(74) *Attorney, Agent, or Firm*—Jaeckle Fleischmann & Mugel, LLP

(57) ABSTRACT

A crosshead assembly for forming extruded shapes from molten polymer. The assembly includes body sections, a mandrel, a choke ring, and a tip holder for admitting, turning, and accelerating molten polymer toward a novel rotatable die sub-assembly. The die sub-assembly includes a hub, axially-loaded duplex ball bearings, and a pulley for rotating the sub-assembly. The choke ring extends into the die sub-assembly, and a cylindrical seal element is disposed therebetween. A changeable extrusion tip is threaded onto the second cylindrical portion of the tip holder. A die in the sub-assembly is specific to the shape to be extruded. For forming a spiral ribbon and a skin layer on core material, the die opening is a circular central aperture and a radial slot. Multiple ribbons may be extruded simultaneously by using multiple slots.

12 Claims, 3 Drawing Sheets

EXTRUSION HEAD HAVING A ROTATING DIE

TECHNICAL FIELD

The present invention relates to an apparatus for extrusion forming of molten polymer material; more particularly, to crossline extrusion heads for continuous extrusion coating of hollow or solid shapes; and most particularly, to an extrusion crosshead having a shaped die opening for applying extrudate material to a cylindrical core material, wherein the die is rotated during extrusion such that the extrudate forms a spiral pattern on the core material.

BACKGROUND OF THE INVENTION

Extrusion heads for continuous extrusion forming of continuous plastic elements having specific cross-sectional shapes are well known. Such extruded elements may include, for example, pipes, rods, moldings, tubings, and the like.

In a typical prior art extrusion system, solid pellets of the thermoplastic material to be used are fed into a progressive-screw extruder wherein the pellets are liquefied under high pressure and are injected into an extrusion head. Such injection may be made axially of the extrusion head, known in the art as "inline," or at an angle, typically 90°, to the axis of the head, known in the art as "crosshead." Except when coating highly flexible core materials such as wire, the coating of a sheath layer onto a core stock requires passing the core stock axially through a die and injecting the molten polymer into the die head in a crosshead relationship.

In a typical prior art extrusion crosshead, a generally cylindrical body element concentrically surrounds a generally cylindrical mandrel, a first annular flow space being provided therebetween. Molten polymer injected orthogonally from a screw extruder enters an annular reservoir provided in either the body element or mandrel and then flows from the reservoir along the annular flow space. Contiguous with the annular flow space is a conical flow space, formed between a conical choke ring and a conical portion of the mandrel, wherein the diameter of annular flow is decreased and the velocity of flow is increased. Downstream of the conical flow space is a second annular flow space formed between a second cylindrical region of the extruder body and a second cylindrical region of the mandrel. This flow space leads into a flow shaping region formed between an extrusion die and an extrusion tip, from whence the formed shape is extruded.

When it is desired to form a coating on a core element, the mandrel and extrusion tip are provided with an axial passage through which the core element is passed as extrusion proceeds.

When it is desired to provide a spiral element in a coating, the extrusion die may be made rotatable of the extrusion body.

Several problems exist in prior art extrusion heads having rotatable dies.

First, it has been found to be difficult to provide a rotatable seal to prevent leakage of molten polymer from the head between axial faces of the stationary and rotating components. Typically, such leakage causes continuous polymer buildup on the outside of the head, resulting eventually in failure of the head and requiring shutdown of the process to clean and restart.

Second, polymer may leak into the bearings, causing failure of the head.

Third, the extrusion die and tip must be heated externally to prevent freeze-up at the start of operation. Such heat is provided typically via a blowtorch, which a) is a crude means of heating, b) requires undesirably a substantial open flame which can damage or melt some core materials such as other plastics, and c) can adversely affect the temper of head elements including the die itself.

Fourth, the bearing assemblies are poor transferors of heat from external blanket heaters into the hub, melt, and extrusion tip.

Fifth, the large surface areas of die and tip within the rotation chamber create high viscous drag, imposing large torque requirements on the driving apparatus.

Sixth, in the prior art it is not known to form a raised spiral ribbon element on a core material by using continuous rotational extrusion of a ribbon element.

It is a principal object of the present invention to prevent leakage of molten polymer from an extrusion head having a rotating die.

It is a further object of the invention to provide a raised spiral ribbon element on a core material by using continuous extrusion of the ribbon element material.

SUMMARY OF THE INVENTION

Briefly described, a polymer extrusion crosshead in accordance with the invention includes conventional components as described above for admitting, turning, and accelerating molten polymer toward a novel rotating die assembly. An annular reservoir is provided for receiving molten polymer from a supply means such as a progressive screw extruder. A generally cylindrical body element concentrically surrounds a generally cylindrical mandrel, a first annular flow space being provided therebetween. Molten polymer injected orthogonally from a screw extruder enters an annular reservoir provided in either the body element or mandrel and then flows from the reservoir along the annular flow space. Contiguous with the annular flow space is a conical flow space, formed between a conical choke ring and a conical portion of the mandrel, wherein the diameter of annular flow is decreased and the velocity of flow is increased. Downstream of the conical flow space is a second annular flow space formed between a cylindrical extension of the choke ring and a second cylindrical portion of the mandrel.

The body element preferably comprises first and second sections to facilitate installation of the conical choke ring. The second body section includes an axial well for receiving a rotatable die assembly including duplex ball bearings that preferably are axially-loaded to prevent radial runout. The cylindrical extension of the choke ring extends through the second body section and into a bore in the rotatable die assembly, and a cylindrical seal element defining a radial-surface seal is disposed therebetween.

A changeable extrusion tip is threaded onto the second cylindrical portion of the tip holder.

The rotatable die assembly includes a hub having a stepped bore for receiving the cylindrical seal element, for cooperating with the extrusion tip to form the second annular flow space, and for receiving a die specific to the shape to be extruded. The cylindrical outer surface of the hub receives the inner races of the duplex bearings which are secured and loaded by a loading nut threaded onto the hub. A drive element, for example, a pulley, is mounted on the hub such that the assembly may be rotated in known fashion during extrusion of polymer through the die.

Preferably, a band heater is mounted at the distal end of the hub for pre-heating the hub and die before extrusion is begun. Because of its cable connections, the heater must be disconnected and/or removed before beginning extrusion.

For forming a spiral ribbon on a rod- or tube-shaped core material, the die opening includes a circular central aperture and a radial slot. The aperture preferably has a diameter slightly larger than the diameter of the core material, such that a continuous skin layer is formed on the core material as it passes through the die. The thickness of the skin layer may be controlled by the diameter of the aperture and the pressure in the extrusion head. Further, the extruding skin helps to hydrodynamically center the core material in the die. The ribbon is extruded simultaneously through the slot integrally with the skin layer. The ribbon dimensions may be controlled by controlling the pressure in the extrusion head. The pitch of the ribbon spiral is a function of the axial speed of the core material through the die and the rotational speed of the die assembly. When the molten skin and ribbon extrusions have cooled and set, the skin layer holds the spiral element in place to prevent axial collapse of the spiral and to aid in bonding the extrusions to the core material.

Obviously, multiple ribbons may be extruded simultaneously by providing a plurality of slots radiating from the central aperture. Further, the cross-sectional shape of each ribbon may be controlled by varying the shape of the ribbon slot in the die.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
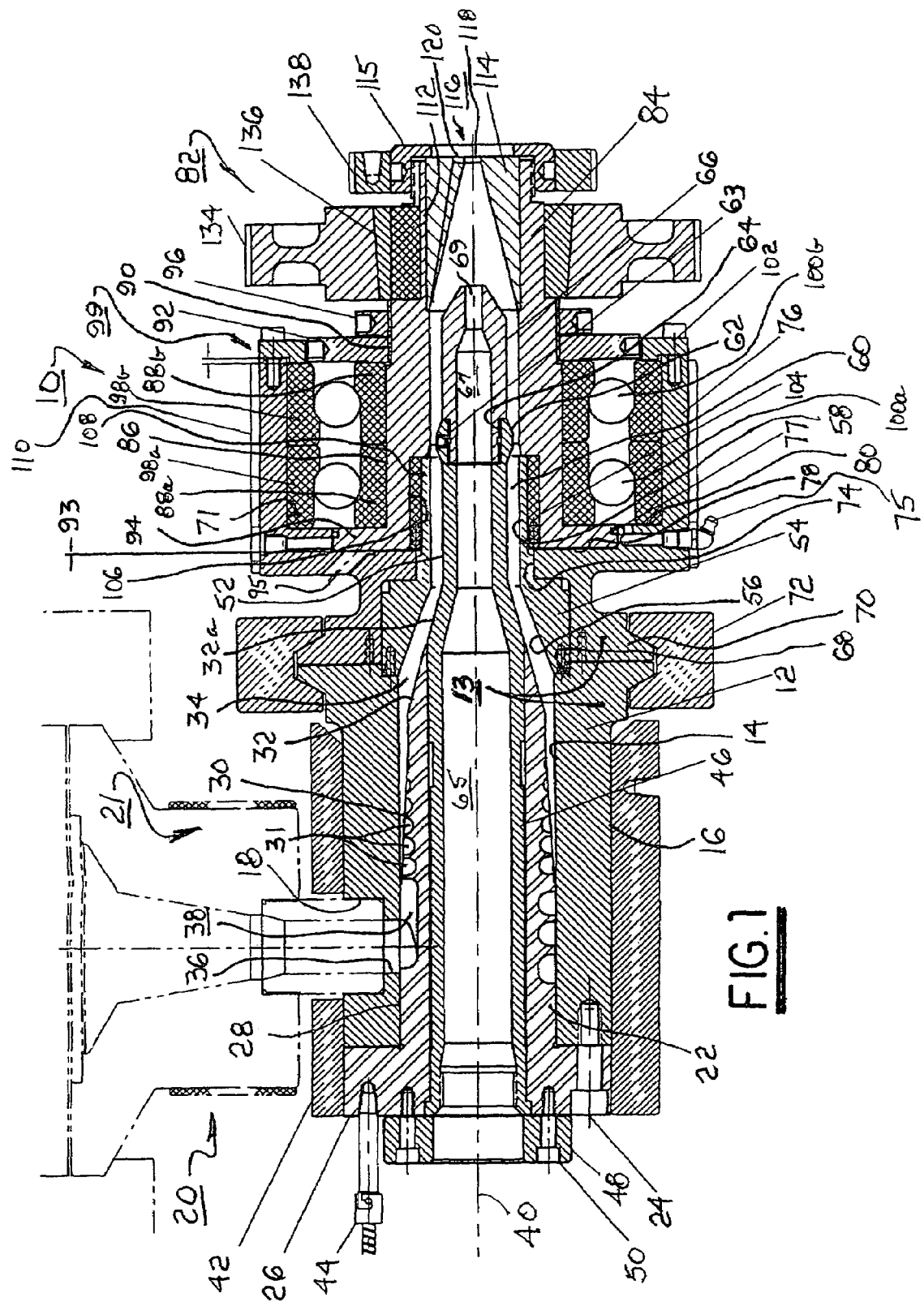
FIG. 1 is an elevational cross-sectional view of a spiral ribbon extrusion crosshead assembly having a rotatable die in accordance with the invention.
Figure 2:
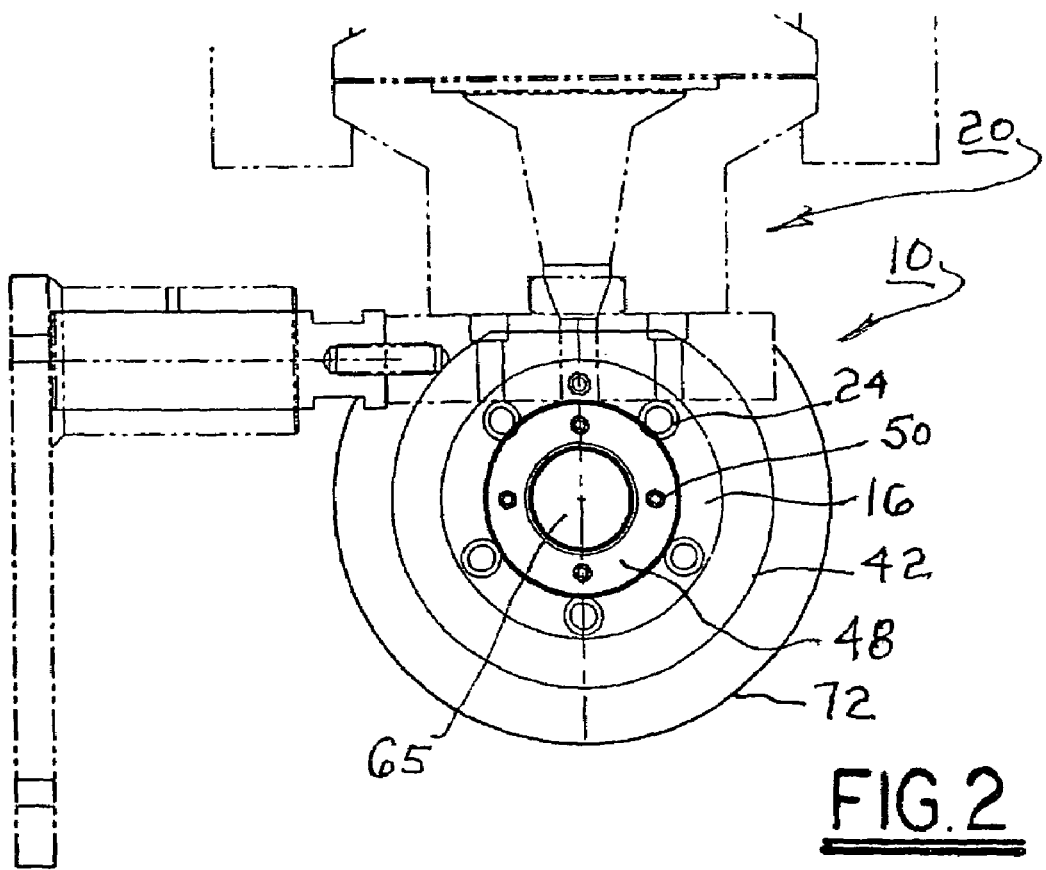
FIG. 2 is an entrance end view of the crosshead assembly shown in FIG. 1.
Figure 3:
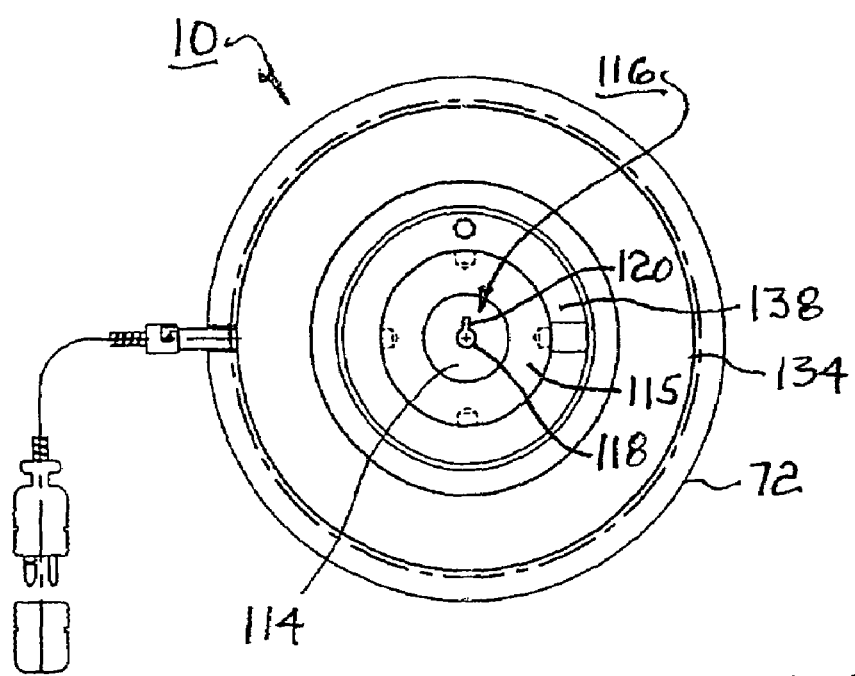
FIG. 3 is an exit end view of the crosshead assembly shown in FIG. 1.
Figure 4:
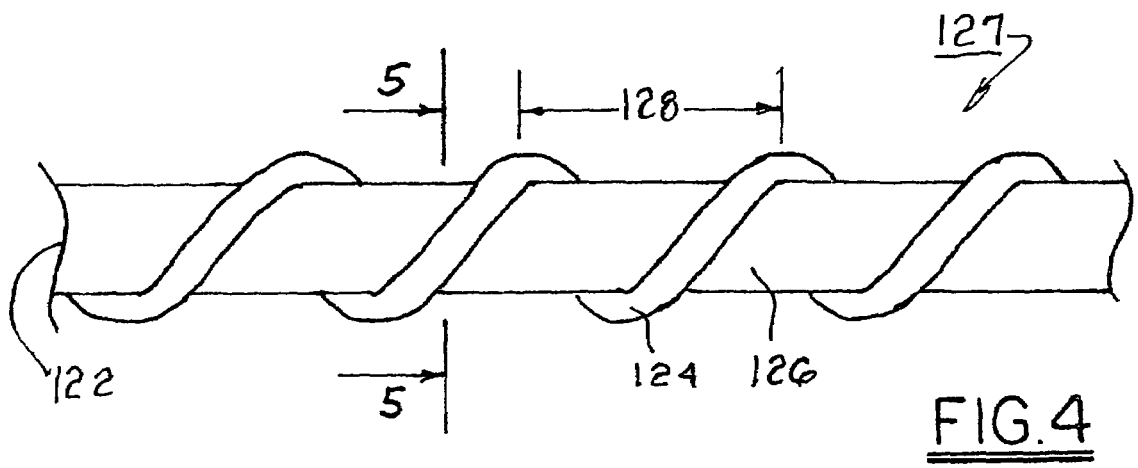
FIG. 4 is a longitudinal view of an exemplary spiral-ribbon extruded element produced by an extrusion crosshead assembly in accordance with the invention.
Figure 5:
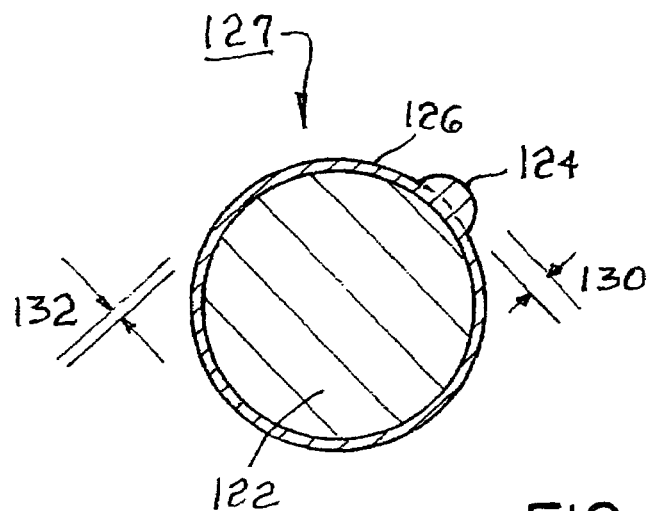
FIG. 5 is a cross-sectional view taken along line 5-5 in FIG. 4.

Referring to FIGS. 1 through 3, there is shown an exemplary embodiment 10 of an improved extrusion crosshead assembly in accordance with the invention. Assembly 10 includes a fixed member 21 and a die sub-assembly 82. Fixed member 21 includes body element 13, mandrel 22, tip holder 46, choke ring 54 and extrusion tip 66. A first body section 12 of body element 13 is substantially cylindrical on an inner surface 14 and outer surface 16 thereof. A radial bore 18 therein is receivable of supply means 20 for providing molten polymer to assembly 10 in use thereof. Mandrel 22 is disposed within section 12 and secured therein via bolts 24 extending through a radial mounting flange 26. Mandrel 22 includes a cylindrical outer surface portion 28 that is close-fitting to inner body surface 14, a first tapered portion 30 having a pattern of decreasing helicoid flow channels 31, and a second tapered portion 32, all defining a progressive annular flow space 34. A radial passage 36 in body section 12 connects bore 18 with an annular reservoir 38 formed in portion 28 for receiving molten polymer into the head assembly. By means of reservoir 38 and flow space 34, polymer flow through head assembly 10 is converted from columnar flow orthogonal to assembly axis 40 to annular flow through space 34. Preferably, body section 12 is surrounded by a band heater 42. Preferably, mandrel flange 26 is provided with a thermal probe 44.

Disposed coaxially and snugly within mandrel 22 is extrusion tip holder 46 which extends beyond mandrel tapered portion 32, having its own portion 32a tapered at substantially the same taper angle to continue progressive annular flow space 34. Tip holder 46 includes an annular mounting flange 48 for securing tip holder 46 to mandrel 22 via bolts 50. A cylindrical portion 52 of tip holder 46 extends from tapered portion 32a.

Surrounding tapered portion 32a and cylindrical portion 52 is choke ring 54 having a tapered inner surface 56 and a cylindrical portion 58 having an axially-extending surface 108, portion 58 cooperating with tip holder portion 52 to define an annular flow space 60.

Tip holder 46 terminates in an enlarged portion 62 which defines an additional choke region in flow space 60, of particular significance in the invention as described below. Portion 62 includes a threaded counterbore 64 for receiving extrusion tip 66. Preferably, a set screw 63 is also provided in portion 62 for securing tip 66 in counterbore 64 and preventing the tip from being unscrewed by viscous drag during rotation of the die assembly when filled with molten polymer. An important additional purpose of enlarged portion 62 is to provide high back pressure of polymer at the seal entrance, as described below.

Tip holder 46 is provided with a stepped axial bore 65 throughout that mates with a similar stepped bore 67 in extrusion tip 66. The narrowest portion 69 of tip 66 has a diameter selected for snug but slidable support of core material to be spiral coated. The axial length of tip 66 is selected to optimize the opposed requirements of a) maximal length for core material support to prevent vibration or chattering, and b) minimal length to minimize surface area for viscous drag during rotation of die sub-assembly 82.

Choke ring 54 is mounted to first body section 12 via a centering counterbore 68 therein and is secured to section 12 via second body section 70 and clamp 72. Second body section 70 of body element 13 includes a stepped well 71 having a central opening 74 through which ring portion 58 protrudes, walls 76, and bottom surfaces 78,80.

Rotatable die sub-assembly 82 is disposed in well 71 of body element 13. Sub-assembly 82 includes a hub 84 having a cylindrical outer surface 86 for receiving first and second inner ball bearing races 88a,88b and a threaded portion 90 of surface 86 for receiving a loading nut 92 for axially loading the inner races against hub flange 94. A locking nut 96 secures loading nut 92. First and second outer ball bearing races 98a,98b of duplex ball bearing assembly 99 are received against wall 76, first and second ball sets 100a,100b being disposed conventionally between the inner and outer races. The outer races are retained by retaining ring 102. A currently preferred axially-loadable duplex ball bearing assembly 99 is Fafnir #7319WN MBR-DU, available from The Timken Company, Canton, Ohio, USA. A grease fitting 75 may be provided for periodic lubrication of the bearing assembly. A resilient rotary seal 77, for example, a Teflon O-ring, is disposed in an annular groove in the outer surface of flange 94 for preventing grease from working along gap 93 into seal element 104 from whence contamination of polymer within the head assembly would be possible. Seal 77 further redundantly eliminates any possibility of polymer entering the ball bearing assemblies.

Cylindrical rotary seal element 104 is disposed against axially-extending surface 106 in hub 84. Preferably, seal element 104 rotates with hub 84, forming a sliding seal with surface 108 of choke ring cylindrical portion 58. A currently preferred seal element is a porous bronze oil-filled bushing such as Bunting #EP364432, available from Bunting Bearings Corp, Holland, Ohio, USA. During operation of the apparatus, the pores in seal element 104 become filled with molten polymer that acts as a lubricant of the seal and also assists in forming a hydrodynamic blockage of significant leakage past element 104. As noted above, an important purpose of enlarged portion 62 is to provide high back pressure in the region including the entrance to seal element 104 to ensure that polymer beneficially enters and fills seal element 104.

Hub flange 94 is off-spaced by gap 93 from bottom surface 78 of body element 13 preferably by about 0.010 inches to assure rotational clearance therebetween. Further, a weep hole 95 is provided in second body section 70 such that any small amount of polymer that may leak by seal element 104, as can happen as the seal wears over time, will be diverted to the exterior of the cross-head assembly and will not find its way into the bearings.

Outboard of walls 76, second body section 70 is surrounded by a heating element 110. Because body section 70 is closely contiguous with hub flange 94 and is in extended contact with the outer races 98a,98b, there is excellent heat transfer from heating element 110 into the interior of hub 84, a significant improvement over the prior art.

An extension 112 of hub 84 is receivable of a die 114 having an extrusion opening 116 suitable for an intended extrusion shape. Die 114 is secured within hub 84 by a threaded retainer 115 disposed on a threaded outer portion of hub 84. In the example shown in FIGS. 1 and 3, die 114 has a central circular opening 118 and a radial slot 120 communicating with opening 118.

Referring to FIGS. 1 through 5, when a rod-shaped core material 122 is fed through the crosshead assembly 10 at a predetermined and fixed linear speed, and die sub-assembly 82 is rotated about axis 40 at a predetermined and fixed rotational speed without rotating core material 122, a spiral ribbon 124 and integral skin coating 126 of polymer are applied to core material 122 at a predetermined pitch 128 and height 130 of ribbon 124 and a predetermined thickness 132 of skin coating 126 to produce an extrusion-coated element 127. Of course, core material 122 may be tubular rather than solid, as may be desired.

Referring again to FIGS. 1 and 3, a preferred drive means for die sub-assembly 82 is a pulley 134 mounted on hub 84 via a wedged bushing 136. Obviously, all other means of driving sub-assembly 82, as may occur to one of skill in the art, are fully comprehended by the invention although not shown here.

Die retainer 115 is surrounded by a band heater 138 for cooperating with heater element 110 for heating the entire rotatable die sub-assembly 82 to a suitable temperature prior to introducing molten polymer into head assembly 10. This is an important advance over the prior art method of heating the apparatus with a blowtorch. Immediately before beginning extrusion activity, heater 138 is electrically disconnected to permit rotation of sub-assembly 82; if desired, heater 138 may be provided in two separable pieces to permit removal from the extrusion head after extrusion activity has begun. The outer portion of sub-assembly 82 is heated satisfactorily by the molten polymer during operation of the apparatus.

In summary, an improved extrusion crosshead having a rotatable die sub-assembly in accordance with the invention provides at least the following benefits over prior art crossheads:

1. An electric preheater at the die provides controlled heating prior to initiating extrusion.
2. Axially pre-loaded duplex ball bearings reduce the torque requirement and provide accurate alignment of the rotating and fixed elements of the head.
3. The secondary choke in the second cylindrical flow region both provides additional smoothing of polymer flow and creates back pressure to assist in providing polymer for seal bushing lubrication.
4. The rotatable assembly is readily removable to change extrusion tips and dies; the basic crosshead assembly remains intact and uninvolved in such changes.
5. The rotating seal between the fixed body and rotating die assembly is changed from being an axial face seal in the prior art to a cylindrical barrel seal.
6. The ball bearing assemblies are redundantly protected from contamination from polymer by the barrel seal, a weep hole, and a rotating seal on the hub flange.
7. A spiral-wrapped ribbon may be readily formed on a continuous core element.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An extrusion head assembly for continuous extrusion of molten polymer in a predetermined cross-sectional shape, the molten polymer being supplied from a source, comprising:
  a) a fixed member for conveying said molten polymer axially of said head, said fixed member including a body element having a cylindrical well and a first axially-extending surface, said fixed member including a mandrel disposed in said body element and surrounding a tip holder, said body element including a first body section surrounding said mandrel;
  b) a die sub-assembly rotatably disposed in said well for receiving said molten polymer from said fixed member and extruding said cross-sectional shape, said die sub-assembly including an extrusion die and a second axially-extending surface; and
  c) a seal element disposed between said first and second axially-extending surfaces and defining a rotatable seal between said fixed member and said die sub-assembly.

2. An extrusion head assembly in accordance with claim 1 further comprising a choke ring.

3. An extrusion head assembly in accordance with claim 2 further comprising a second body section having means for capturing said choke ring against said first body section.

4. An extrusion head assembly in accordance with claim 3 wherein said cylindrical well includes a central opening and wherein said choke ring extends through said central opening into said well to provide said first axially-extending surface.

5. An extrusion head assembly for continuous extrusion of molten polymer in a predetermined cross-sectional shape, the molten polymer being supplied from a source, comprising:
   a) a fixed member for conveying said molten polymer axially of said head, said fixed member including a body element having a cylindrical well and a first axially-extending surface, said well having a wall and a bottom surface;
   b) a die sub-assembly rotatably disposed in said well for receiving said molten polymer from said fixed member and extruding said cross-sectional shape, said die sub-assembly including an extrusion die and a second axially-extending surface, said die sub-assembly further including a hub having a radial flange adjacent and off-spaced from said bottom surface by a predetermined axial distance, said hub providing said second axially-extending surface and including an axial bore for receiving said extrusion die, said die sub-assembly further including a die retainer disposed on said hub; and
   c) a seal element disposed between said first and second axially-extending surfaces and defining a rotatable seal between said fixed member and said die sub-assembly.

6. An extrusion head assembly for continuous extrusion of molten polymer in a predetermined cross-sectional shape, the molten polymer being supplied from a source, comprising:
   a) a fixed member for conveying said molten polymer axially of said head, said fixed member including a body element having a cylindrical well and a first axially-extending surface, said well having a wall and a bottom surface;
   b) a die sub-assembly rotatably disposed in said well for receiving said molten polymer from said fixed member and extruding said cross-sectional shape, said die sub-assembly including an extrusion die and a second axially-extending surface, said die sub-assembly further including a hub having a radial flange adjacent and off-spaced from said bottom surface by a predetermined axial distance, said hub providing said second axially-extending surface, said die sub-assembly further comprising a first band heater surrounding said die; and
   c) a seal element disposed between said first and second axially-extending surfaces and defining a rotatable seal between said fixed member and said die sub-assembly.

7. An extrusion head assembly in accordance with claim 6 wherein said first band heater is removable from said die sub-assembly during extrusive operation of said extrusion head assembly.

8. An extrusion head assembly for continuous extrusion of molten polymer in a predetermined cross-sectional shape, the molten polymer being supplied from a source, comprising:
   a) a fixed member for conveying said molten polymer axially of said head, said fixed member including a body element having a cylindrical well and a first axially-extending surface;
   b) a die sub-assembly rotatably disposed in said well for receiving said molten polymer from said fixed member and extruding said cross-sectional shape, said die sub-assembly including an extrusion die and a second axially-extending surface, said extrusion die including a central opening for receiving core material from said fixed member and extruding a skin coating thereupon, and at least one radial slot for extruding a ribbon of said molten polymer onto said core material; and
   c) a seal element disposed between said first and second axially-extending surfaces and defining a rotatable seal between said fixed member and said die sub-assembly.

9. An extrusion head assembly in accordance with claim 8 wherein said ribbon is integral with said skin coating.

10. An extrusion head assembly for continuous extrusion of molten polymer in a predetermined cross-sectional shape, the molten polymer being supplied from a source, comprising:
   a) a fixed member for conveying said molten polymer axially of said head, said fixed member including a body element having a cylindrical well and a first axially-extending surface;
   b) a die sub-assembly rotatably disposed in said well for receiving said molten polymer from said fixed member and extruding said cross-sectional shape, said die sub-assembly including an extrusion die and a second axially-extending surface; and
   c) a seal element disposed between said first and second axially-extending surfaces and defining a rotatable seal between said fixed member and said die sub-assembly, wherein said seal element is formed of sintered bronze.

11. An extrusion head assembly for continuous extrusion of molten polymer in a predetermined cross-sectional shape, the molten polymer being supplied from a source, comprising:
   a) a fixed member for conveying said molten polymer axially of said head, said fixed member including a body element having a cylindrical well and a first axially-extending surface;
   b) a die sub-assembly rotatably disposed in said well for receiving said molten polymer from said fixed member and extruding said cross-sectional shape, said die sub-assembly including an extrusion die and a second axially-extending surface;
   c) a seal element disposed between said first and second axially-extending surfaces and defining a rotatable seal between said fixed member and said die sub-assembly; and
   d) a band heater surrounding said well in said fixed member.

12. An extrusion head assembly for continuous extrusion of molten polymer in a predetermined cross-sectional shape, the molten polymer being supplied from a source, comprising:
   a) a fixed member for conveying said molten polymer axially of said head, said fixed member including a body element having a cylindrical well and a first axially-extending surface;
   b) a die sub-assembly rotatably disposed in said well for receiving said molten polymer from said fixed member and extruding said cross-sectional shape, said die sub-assembly including an extrusion die and a second axially-extending surface; and
   c) a seal element disposed between said first and second axially-extending surfaces and defining a rotatable seal between said fixed member and said die sub-assembly, wherein said extrusion head is a crosshead.

* * * * *